United States Patent
Marshall et al.

(10) Patent No.: US 12,043,107 B2
(45) Date of Patent: Jul. 23, 2024

(54) AIR INTAKE ASSEMBLY FOR VEHICLE, FRONT END ASSEMBLY OF VEHICLE, AND METHOD

(71) Applicant: Honda Motor Co., Ltd., Tokyo (JP)

(72) Inventors: Stephen J. Marshall, Raymond, OH (US); Steve Faria, Raymond, OH (US); Patrick J. Ellison, Raymond, OH (US); Taiga Marukawa, Raymond, OH (US); Takashi Nakano, Raymond, OH (US); Akira Futatsuhashi, Raymond, OH (US); Keiichiro Tsuji, Raymond, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 41 days.

(21) Appl. No.: 17/696,302

(22) Filed: Mar. 16, 2022

(65) Prior Publication Data

US 2023/0294509 A1 Sep. 21, 2023

(51) Int. Cl.
*B60K 11/08* (2006.01)
*B60K 11/04* (2006.01)
*B60K 13/02* (2006.01)

(52) U.S. Cl.
CPC ............ *B60K 11/085* (2013.01); *B60K 11/04* (2013.01); *B60K 13/02* (2013.01)

(58) Field of Classification Search
CPC ........ B60K 11/085; B60K 11/04; B60K 13/02
See application file for complete search history.

(56) References Cited

U.S. PATENT DOCUMENTS

| | | | |
|---|---|---|---|
| 4,420,057 A | 12/1983 | Omote et al. | |
| 6,814,400 B2 * | 11/2004 | Henderson | B62D 29/001 296/203.02 |
| 9,016,772 B2 * | 4/2015 | Townson | B62D 25/085 296/193.1 |
| 9,533,565 B2 | 1/2017 | Elliott et al. | |
| 9,644,525 B2 * | 5/2017 | Bignon | B60K 11/085 |
| 9,840,144 B2 | 12/2017 | Aizawa et al. | |
| 9,950,610 B2 | 4/2018 | Kaneko et al. | |
| 9,969,342 B2 * | 5/2018 | Klop | B60R 19/52 |
| 9,982,638 B2 | 5/2018 | Wadi et al. | |
| 10,040,344 B2 * | 8/2018 | Schöning | B60R 19/48 |
| 10,100,707 B2 | 10/2018 | Wolf et al. | |
| 10,106,197 B2 * | 10/2018 | Hart | B62D 25/084 |

(Continued)

FOREIGN PATENT DOCUMENTS

| | | |
|---|---|---|
| CN | 109624693 A | 4/2019 |
| WO | WO2018142330 A1 | 8/2018 |

*Primary Examiner* — Kurt Philip Liethen
(74) *Attorney, Agent, or Firm* — KENEALY VAIDYA LLP

(57) ABSTRACT

A vehicle fender air intake assembly for a vehicle can include a central baffle configured to be mounted to a body structure of the vehicle, a central shutter mounted on the central baffle, a lower baffle configured to be mounted to the body structure, a lower shutter mounted on the lower baffle, and an upper baffle including a first side and a second side that opposes the first side. The upper baffle can terminate at the first side and the second side. The first side can include a first opening in fluid communication with the central baffle, and the second side can include a second opening in fluid communication with the central baffle.

18 Claims, 10 Drawing Sheets

(56) References Cited

U.S. PATENT DOCUMENTS

| | | | |
|---|---|---|---|
| 10,343,512 B2 | 7/2019 | Tanaka et al. | |
| 10,538,158 B2 | 1/2020 | Sedlak | |
| 10,697,351 B2 | 6/2020 | Jolk et al. | |
| 11,046,171 B2 * | 6/2021 | Jaldelid | B60K 11/00 |
| 11,142,059 B2 * | 10/2021 | Vacca | B62D 25/085 |
| 2005/0076871 A1 | 4/2005 | Paek | |
| 2010/0243351 A1 * | 9/2010 | Sakai | F01P 7/10 |
| | | | 296/180.5 |
| 2010/0243352 A1 | 9/2010 | Watanabe et al. | |
| 2012/0043051 A1 * | 2/2012 | Kurokawa | B60K 11/04 |
| | | | 165/41 |
| 2012/0091757 A1 * | 4/2012 | Tregnago | B60K 11/085 |
| | | | 296/193.1 |
| 2017/0129324 A1 * | 5/2017 | Kaneko | B60K 11/085 |
| 2019/0270376 A1 * | 9/2019 | Sedlak | B60K 11/085 |

* cited by examiner

AIR INTAKE ASSEMBLY FOR VEHICLE, FRONT END ASSEMBLY OF VEHICLE, AND METHOD

BACKGROUND

The disclosed subject matter relates to an air intake system for a vehicle. More particularly, the disclosed subject matter relates to methods and apparatus that supply air to a heat exchanger, power source, and/or a passenger cabin.

A vehicle can use ambient air flowing around the vehicle to cool and ventilate various components, systems and spaces of a vehicle. For example, the vehicle can include at least one heat exchanger that can cool fluid flowing through an internal combustion engine or a battery assembly. The vehicle can include a heating, ventilating and air conditioning ("HVAC") system for modulating the temperature and airflow in the passenger space. If the vehicle is powered by an internal combustion engine, the engine can intake the ambient air to support the combustion of fuel in the engine.

SUMMARY

Some embodiments are directed to a vehicle fender air intake assembly for a vehicle including a body structure. The vehicle fender air intake assembly can include a central baffle configured to be mounted to the body structure, a central shutter mounted on the central baffle, a lower baffle configured to be mounted to the body structure, a lower shutter mounted on the lower baffle, and an upper baffle including a first side and a second side that opposes the first side. The upper baffle can terminate at the first side and the second side. The first side can include a first opening in fluid communication with the central baffle, and the second side can include a second opening in fluid communication with the central baffle.

Some embodiments are directed to a front end assembly for a vehicle that can include a beam extending along a transverse direction of the vehicle, a heat exchanger module adjacent to the beam, and an air intake assembly. The heat exchanger module can include a shroud, and at least one air-to-liquid heat exchanger mounted within the shroud. The air intake assembly can include a first baffle, a first shutter, a second baffle, a second shutter, and a third baffle. The first baffle can be connected to the beam and in fluid communication with air-to-fluid heat exchanger. The first shutter mounted on the first baffle and configured to selectively open and close fluid communication between the first baffle and the air-to-liquid heat exchanger. The second baffle can be connected to the beam and in fluid communication with the air-to-liquid heat exchanger. The second shutter mounted on the second baffle and configured to selectively open and close fluid communication between the second baffle and the air-to-liquid heat exchanger. The third baffle can include a first side and a second side that opposes the first side. The first side can include a first opening in fluid communication with the second baffle, the second side can include a second opening in fluid communication with the second baffle, and the first and second openings can face in the transverse direction of the vehicle.

Some embodiments are directed to a method for assembling a vehicle fender air intake to a body of a vehicle, the method can include: connecting a heat exchanger module to the body, the heat exchanger module includes a shroud and at least one air-to-liquid heat exchanger mounted adjacent the shroud; mounting a lower shutter to a lower baffle, the lower shutter is configured to selectively open and close fluid communication between the lower baffle and the air-to-liquid heat exchanger; mounting a central shutter to a central baffle, the central shutter is configured to selectively open and close fluid communication between the central baffle and the air-to-liquid heat exchanger; connecting a respective one of a pair of side baffles to a respective one of a pair of shutter bars; connecting the shutter bars to the body after connecting the side baffles to the shutter bars; connecting the central baffle to the shutter bars; connecting a first harness to the central shutter after connecting the central baffle to the shutter bars; connecting the lower baffle to the shutter bars; connecting a second harness to the lower shutter after connecting the lower baffle to the shutter bars; and mounting an upper baffle on the shroud.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

A vehicle can travel along any one or combination of improved, unimproved, and unmarked paths and in all weather conditions, including but not limited to, snow. Snow precipitation and/or fallen snow blown by the wind can enter the air intake passage(s) of the vehicle along with the ambient air when the vehicle is driven. Snow entrained in the ambient air and flowing into the air intake passage(s) can accumulate in the air intake passage(s) such that the accumulating snow can reduce the size of the passage(s) and reduce or stop the flow of air through the air intake passage(s). Instead of or in addition to snow, other debris can be entrained in the air flow through the intake passages. This debris can include, but is not limited to, liquid water, leaves, insects, gravel and any combination.

Figure 1:
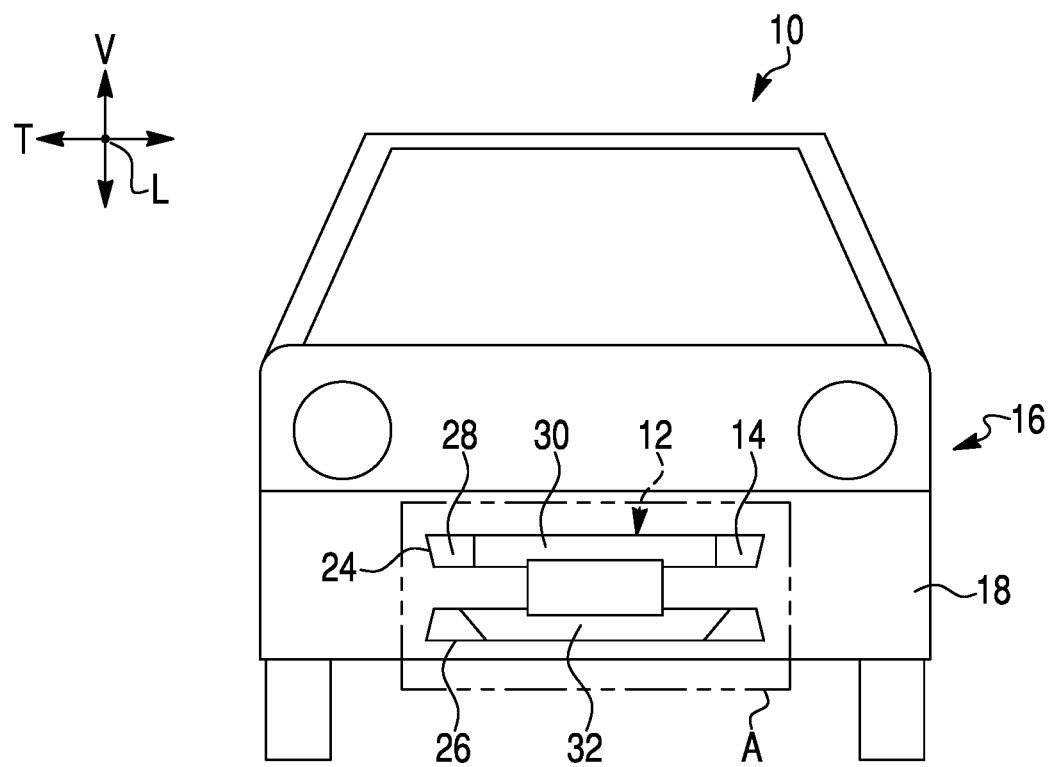
FIG. 1 is a plan view of a front end of a vehicle including an air intake assembly in accordance with principles of the disclosed subject matter.

FIG. 1 schematically illustrates a front end of a vehicle 10 that includes an air intake assembly 12 made in accordance with principles of the disclosed subject matter. The air intake assembly 12 can include at least one air intake opening 14 in fluid communication with ambient air flowing toward and along the front end of the vehicle 10. The air intake assembly 12 can be configured to make it difficult for snow, liquid water, and/or other debris to accumulate in the air intake assembly 12 or at least lessen the severity of one or more adverse effects of accumulation of snow, liquid water, and/or other debris in the air intake assembly 12.

Figure 2:
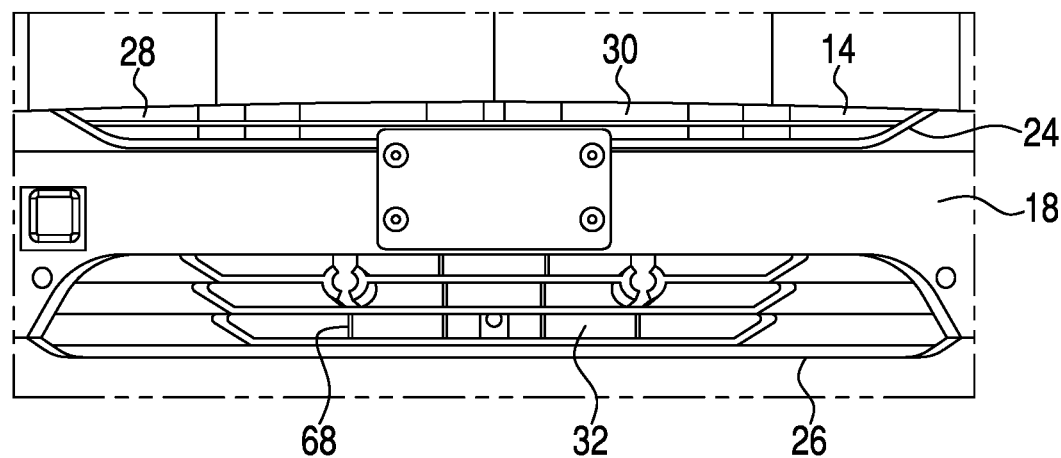
FIG. 2 is an enlarged view of a portion A of FIG. 1.
Figure 3:
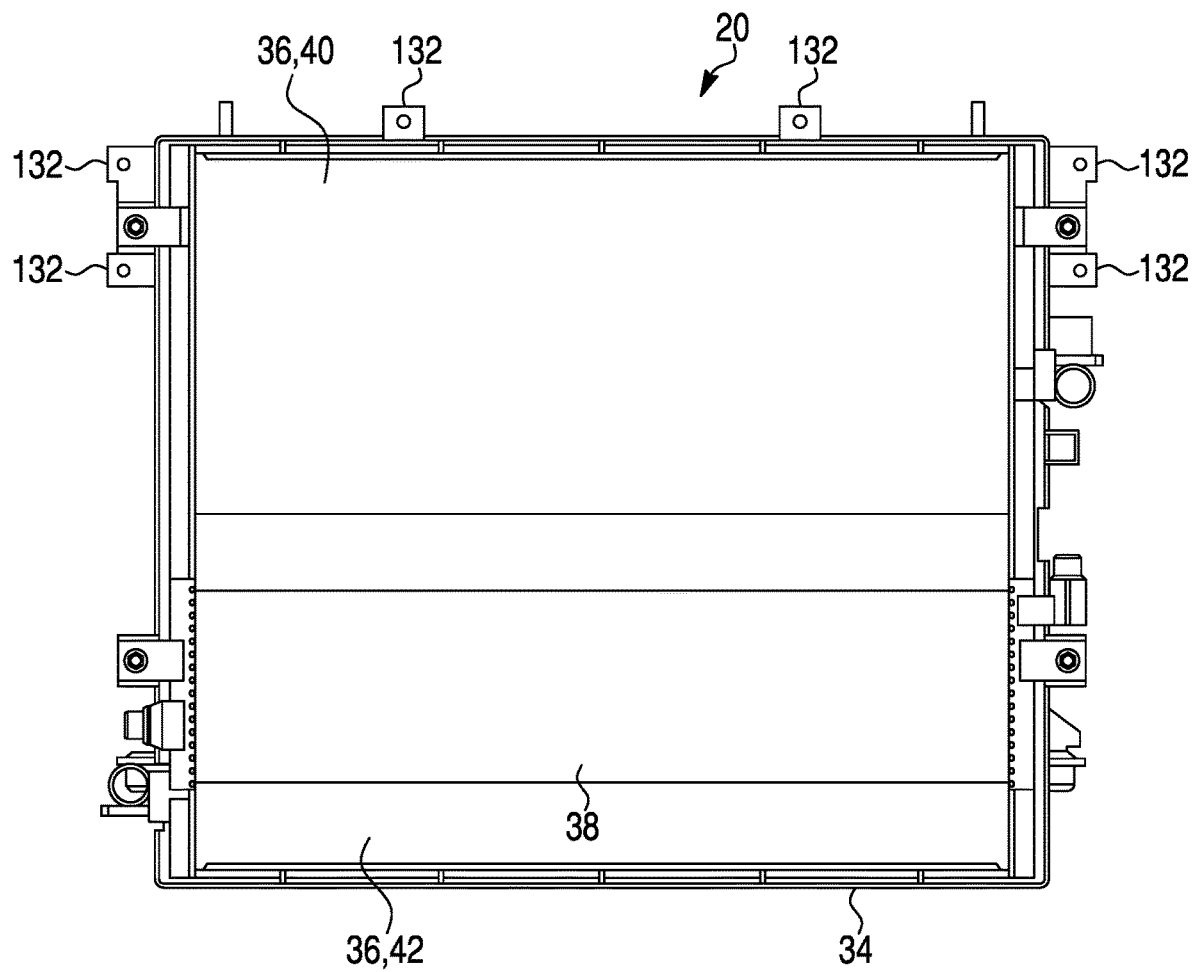
FIG. 3 is a front plan view of a heat exchanger module of the vehicle of FIG. 1.

The vehicle 10 can include a front end assembly 16 located at the front of the vehicle 10. The front end assembly 16 can include a body panel 18 and the air intake assembly 12. Most of the air intake assembly 12 is concealed from view in FIG. 1 by the body panel 18. Referring to FIG. 3, the front end assembly 16 can include a heat exchanger module 20. Referring to FIG. 2, the front end assembly 16 can include a beam 22.

The beam 22 can be a bumper beam or other structural beam of the vehicle such as but not limited to a support beam to which other component(s) and/or system(s) of the vehicle 10 can be mounted. The beam 22 can extend across the vehicle 10 along a transverse direction T of the vehicle 10. The beam 22 can also extend in a vertical direction V of the vehicle 10. The beam 22 can be straight, flat beam, or the beam 22 can be curved such that the beam 22 extends in a longitudinal direction L of the vehicle 10.

Referring to FIGS. 1 and 2, the body panel 18 can extend across the front of the vehicle 10 along the transverse direction T of the vehicle 10 The body panel 18 can have any appropriate shape such as but not limited to a flat panel and a curved panel. In the exemplary embodiment, the body panel 18 can be curved such that the body panel 18 extends along the transverse direction T of the vehicle 10, the longitudinal direction L of the vehicle 10, and the vertical direction V of vehicle 10. The body panel 18 can cover the beam 22 and at least a portion of other component(s) and/or system(s) of the vehicle 10 such as but not limited to the heat exchanger module 20 and the air intake assembly 12.

The body panel 18 can include a first opening 24 and a second opening 26. The first opening 24 can be spaced away from the second opening 26 in the vertical direction V of the vehicle 10. The first opening 24 can overlap the second opening 26 in the vertical direction V of the vehicle 10. The openings 24, 26 can extend in the transverse direction T of the vehicle 10 and along the vertical direction V of the vehicle 10.

The air intake assembly 12 can include a second air intake opening 28, a central intake opening 30 and a lower intake opening 32. The first, second and central air intake openings 14, 28, 30 can be in fluid communication with the first opening 24 of the body panel 18. The lower air intake opening 32 can be in fluid communication with the second opening 26 of the body panel 18. The central air intake opening 30 and the lower intake opening 32 can be in fluid communication with the heat exchanger module 20. The first and second air intake openings 14, 28 can be in fluid communication with another system or structure of the vehicle 10, such as but not limited to, an internal combustion engine or a heating ventilation and air conditioning ("HVAC") system. As will be described in further detail below, the air intake system 12 can include one or more shutter assemblies that can selectively open and close fluid communication between the air intake system 12 and the heat exchanger module 20.

Referring to FIG. 3, the heat exchanger module 20 can include a shroud 34, a first heat exchanger 36, and a second heat exchanger 38. The heat exchanger module 20 can also be referred to as a condenser-radiator-fan module (CRFM).

The shroud 34 can include a frame in which the heat exchangers 36, 38 are mounted. The shroud 34 can also include a frame, housing or other supporting structure for a fan that can be configured to draw air through the openings 24, 26 of the body panel 18 and the air intake openings 14, 28, 30, 32 of the air intake assembly 12 and across the heat exchangers 36, 38. The fan can be located on one side of the first heat exchanger 36 that is opposite to the side shown in FIG. 3 with respect to the longitudinal direction L of the vehicle 10.

The first heat exchanger 36 can be an air-to-liquid heat exchanger that cools a liquid that circulates through an internal combustion engine and/or a battery pack of the vehicle 10. The first heat exchanger 36 can be referred to as a radiator. The first heat exchanger 36 can include an upper portion 40 and a lower portion 42. However, alternate embodiments can include the upper and lower portions merged into a single continuous structure.

The second heat exchanger 38 can be an air-to-gas heat exchanger that cools a refrigerant that circulates through the HVAC system of the vehicle 10. The second heat exchanger 38 can be referred to as a condenser. The second heat exchanger 38 can be located in front of the lower portion 42 of the first heat exchanger 36 in the longitudinal direction L of the vehicle 10.

Figure 4:
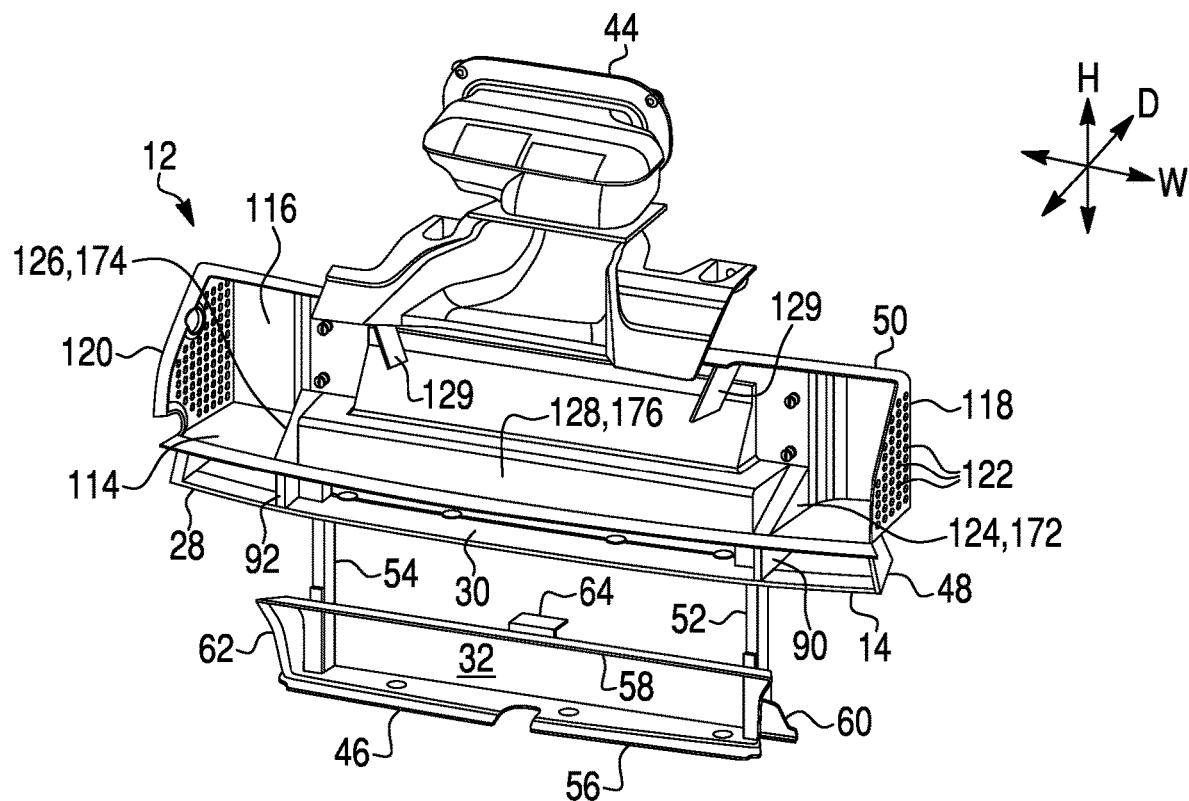
FIG. 4 is a front perspective view of the air intake assembly of the vehicle of FIG. 1.
Figure 5:
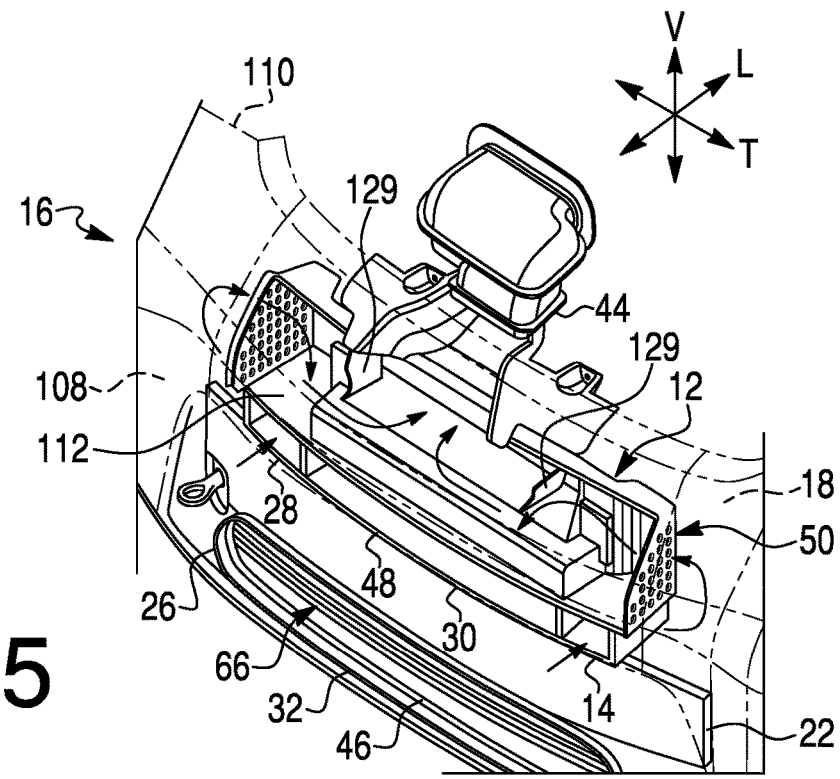
FIG. 5 is a front perspective view of a front end assembly of the vehicle of FIG. 1 with a body panel of the front end assembly shown in phantom.

Referring to FIGS. 4 and 5, the vehicle 10 can include an air duct 44. The air duct 44 can be in fluid communication with an internal combustion engine of the vehicle 10 or with an HVAC system of the vehicle. The air intake assembly 12 can be in fluid communication with the air duct 44 and can direct air from the first opening 24 in the body panel 18 to the air duct 44.

The air intake assembly 12 can include a lower baffle 46, a central baffle 48, an upper baffle 50, and a pair of mounting assemblies 52, 54. As will be described in further detail below, the baffles 46, 48, 50 can guide air that passes through the openings 24, 26 in the body panel 18 to flow toward the heat exchangers 36, 38 and the air duct 44. The mounting assemblies 52, 54 can connect the lower baffle 46 and the central baffle 48 to the beam 22. The upper baffle 50 can be connected to the shroud 34 separately from the mounting assemblies 52, 54.

Referring to FIG. 4, the air intake assembly 12 can have a height direction H, a width direction W and a depth direction D. The height direction H, the width direction W and the depth direction D can respectively correspond to the vertical direction V, the transverse direction T and the longitudinal direction L of the vehicle 10.

FIG. 5 shows the positions of the baffles 46, 48, 50 relative to the body panel 18 and the beam 22. The body panel 18 is shown in phantom, except for the second opening 26. The body panel 18 can cover the beam 22 and the upper baffle 50 in the vertical direction V and the transverse direction T. The body panel 18 can include a front surface 108 that forms a portion of a front exterior surface of the vehicle 10 and a rear surface 110 that is opposite to the front surface 108. The rear surface 110 can face the beam 22 and the upper baffle 50 in the longitudinal direction L. The beam 22 can be located between the lower baffle 46 and the central baffle 48 in the vertical direction V of the vehicle 10.

Figure 6:
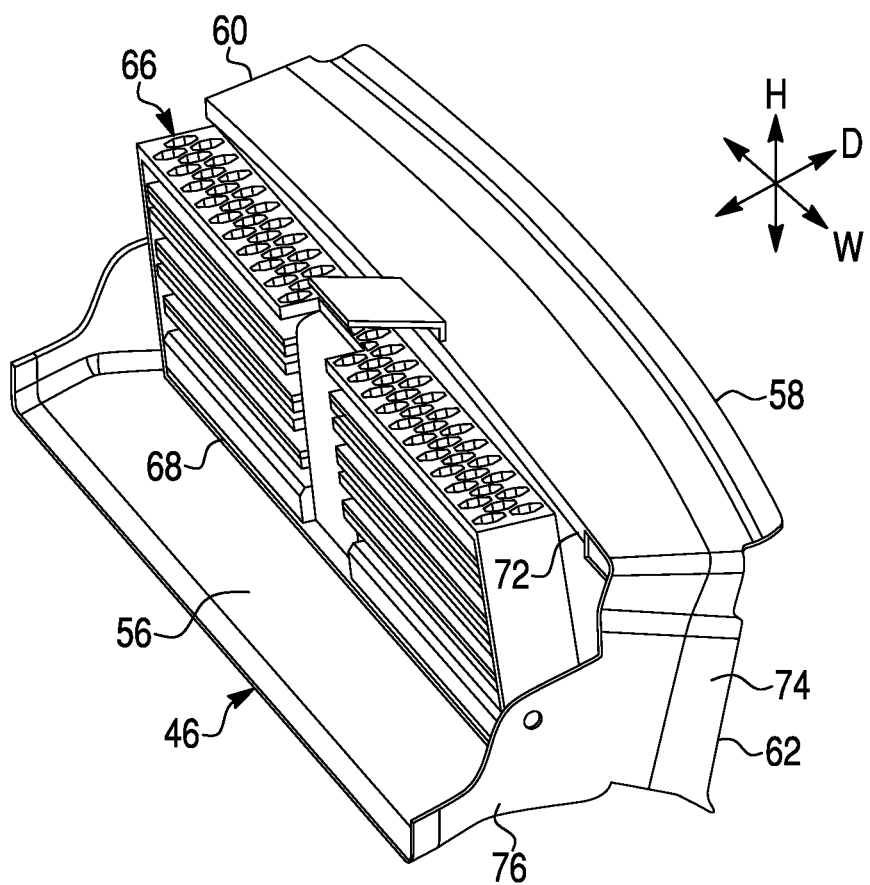
FIG. 6 is rear perspective view of a lower baffle and a lower shutter of the air intake assembly of the vehicle of FIG. 1.

Referring to FIG. 4, the lower baffle 46 can include the lower intake opening 32. Referring to FIGS. 4 and 6, the lower baffle 46 can include a bottom wall 56, a top wall 58, and a pair of side walls 60, 62. The walls 56, 58, 60, 62 can be integrally formed as a single, homogenous structure. The walls 56, 58, 60, 62 of the lower baffle 46 can frame the lower air intake opening 32. The walls 56, 58, 60, 62 can abut the rear surface of the body panel 18 adjacent to the second opening 26 in the body panel 18. The walls 56, 58, 60, 62 can form and surround the second opening 26 in the body panel 18 and can extend away from the rear surface of the body panel 18 and toward the rear end of the vehicle 10 along the longitudinal direction L of the vehicle 10. The walls 56, 58, 60, 62 can guide air that enters the lower air intake opening 32 toward the heat exchanger module 20.

The bottom wall 56 can extend along the width direction W and the depth direction D. The bottom wall 56 can be a flat wall or a curved wall. The bottom wall 56 can extend from the first side wall 60 to the second side wall 62 along the width direction W. The bottom wall 56 can abut the shroud 34 and/or the lower portion 42 of the first heat exchanger 36. Thus, the bottom wall 56 can guide air that passes through the lower air intake 32 away from a path that goes underneath the bottom of the shroud 34.

The top wall 58 can extend along the width direction W and the depth direction D of the air intake assembly 12. The top wall 58 can be a flat wall or a curved wall. The top wall 58 can extend from the first side wall 60 to the second side wall 62 along the width direction W. The top wall 58 can be spaced away from the bottom wall 56 in the height direction H of the air intake assembly 12. The top wall 58 can be offset with respect to the bottom wall 56 in the depth direction D. The offset can be away from the heat exchanger module 20 in the depth direction D of the air intake assembly 12 (which direction can also be the longitudinal direction L of the vehicle 10). The offset can space a rear edge 72 (see FIG. 6) of the top wall 58 away from the second heat exchanger 38 and create a space for air passing through the lower baffle 46 to flow along and into the heat exchangers 36, 38 in all of the longitudinal direction L, the transverse direction T and the vertical direction V of the vehicle 10.

The side walls 60, 62 can be connected to and extend from the top wall 58 and the bottom wall 56. The side walls 60, 62 can extend along the depth direction D and the height direction H of the air intake assembly 12. The first side wall 60 can mirror the structure of the second side wall 62. Further details of the side wall 60 are described with respect to the second side wall 62, which can be identical or similar in structure.

The second side wall 62 can include a main body 74 and an extension 76. The main body 74 can extend from the bottom wall 56 to the top wall 58. The main body 74 can extend in the height direction H and the depth direction D of the air intake assembly 12. The extension 76 can extend away from the main body 74 and toward the lower portion 42 of the first heat exchanger 36 along the depth direction D. The extension 76 can be spaced away from the top wall 58 in the height direction H. The extension 76 can direct some of the air passing through the lower baffle 46 to flow along the longitudinal direction L of the vehicle 10 and toward the lower portion 42 of the first heat exchanger 36. The extension 76 can permit some of the air passing through the lower baffle 46 to flow along the heat exchangers 36, 38 in all of the longitudinal direction L, the transverse direction T and the vertical direction V of the vehicle 10 and through the heat exchangers 36, 38 along the longitudinal direction L of the vehicle 10.

Figure 7:
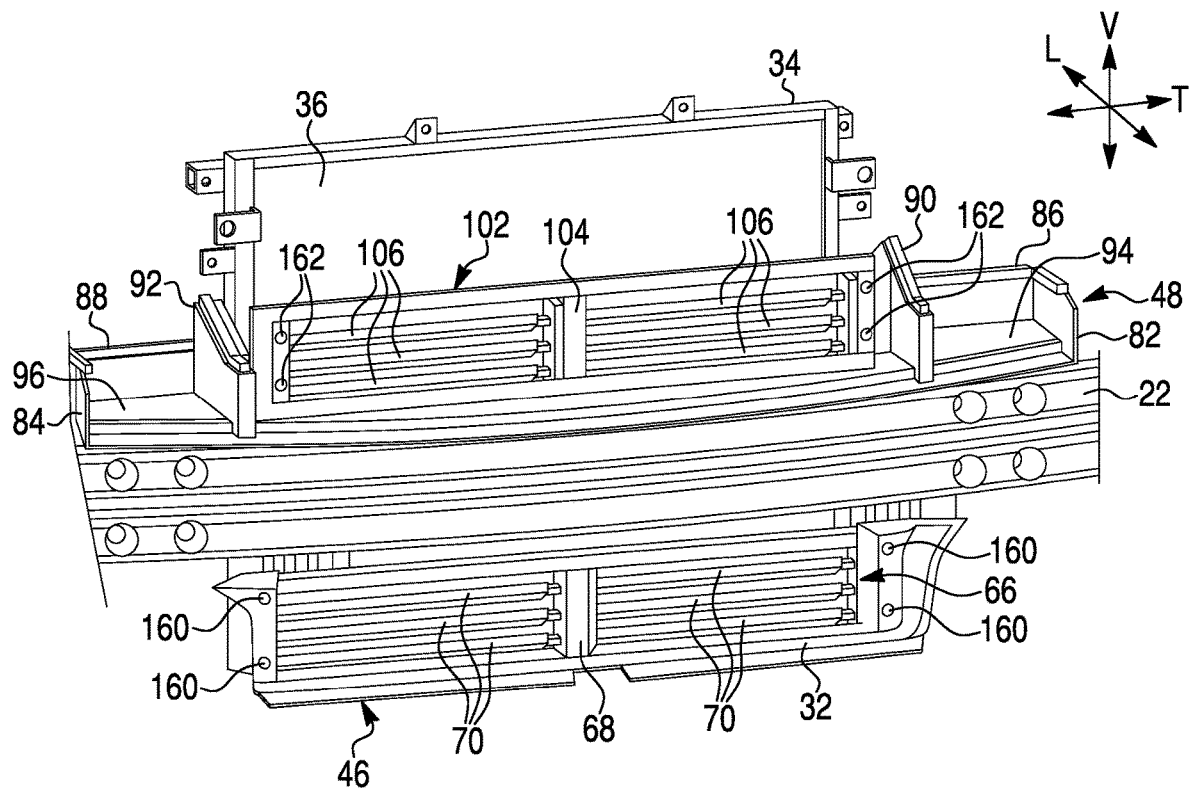
FIG. 7 is a front perspective view of a partially assembled state of the front end assembly of the vehicle of FIG. 1.

Referring to FIGS. 6 and 7, the air intake assembly 12 can include a lower shutter 66. The lower shutter 66 can be mounted on the lower baffle 46 in any appropriate manner that secures the lower shutter 66 to the lower baffle 46. FIG. 6 shows a rear perspective view of the lower baffle 46 and the lower shutter 66. FIG. 7 shows a front perspective view of the lower baffle 46 and the lower shutter 66. The lower shutter 66 can extend across the lower air intake opening 32 along the width direction W. The lower shutter 66 can abut each of the walls 56, 58, 60, 62 of the lower baffle 46. The lower baffle 46 can include a tab 64 that extends away from the top wall 58 in the depth direction D. The tab 64 can be configured to direct snow, liquid water and/or other debris away from an actuator (for example, the electric motor 168 of FIG. 10).

The lower shutter 66 can include a frame 68 and a plurality of louvers 70. Each of the louvers 70 can be pivotally connected to and mounted within the frame 68. In the exemplary embodiment of FIG. 6, the louvers 70 can pivot about an axis that extends along the width direction W.

Figure 10:
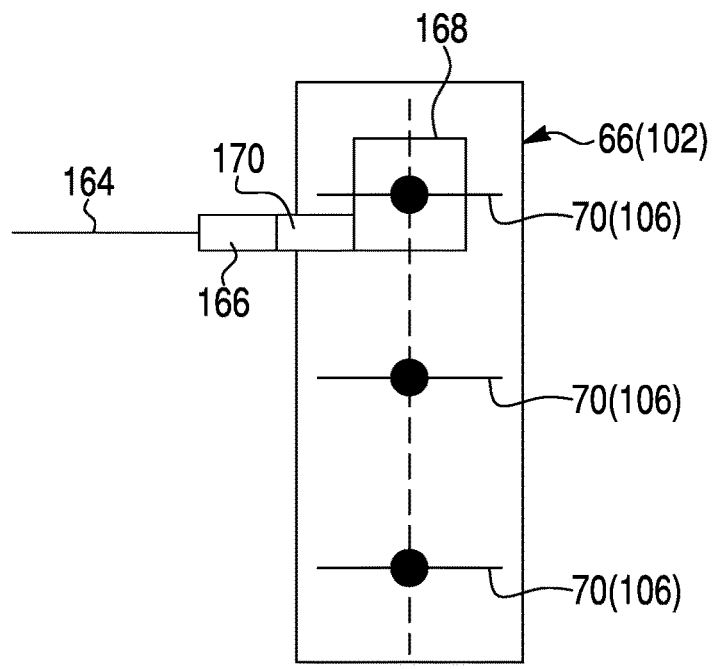
FIG. 10 is a schematic view of representing the lower shutter and the central shutter of the vehicle of FIG. 1.

FIG. 10 schematically illustrates the lower shutter 66. The lower shutter 66 can include an electric motor 168 that is connected to the louvers 70 and can pivot each of the louvers 70 between an opened position and a closed position. FIG. 10 shows the opened position of the louvers 70 in solid lines and the closed position of the louvers in phantom. When in the opened position, the louvers 70 can permit fluid communication between the lower air intake opening 32 and the first and second heat exchangers 36, 38. When in the closed position, the louvers 70 can close fluid communication between the lower air intake opening 32 and the first and second heat exchangers 36, 38. The louvers 70 can be moved to an intermediate position that is between the closed position and the opened position to provide a reduced airflow through the lower baffle 46 as compared to the opened position.

Figure 8:
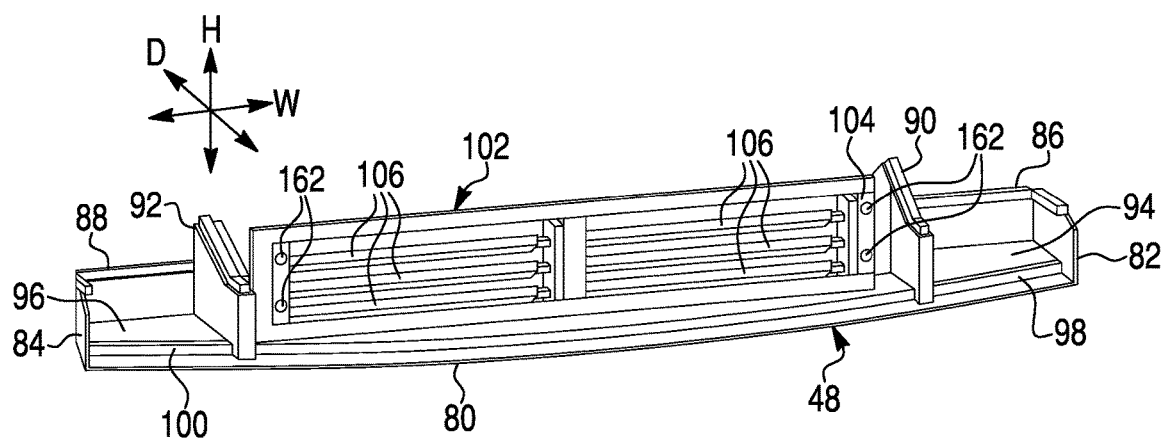
FIG. 8 is a front perspective view of a central baffle and a central shutter of the air intake assembly of the vehicle of FIG. 1.
Figure 9:
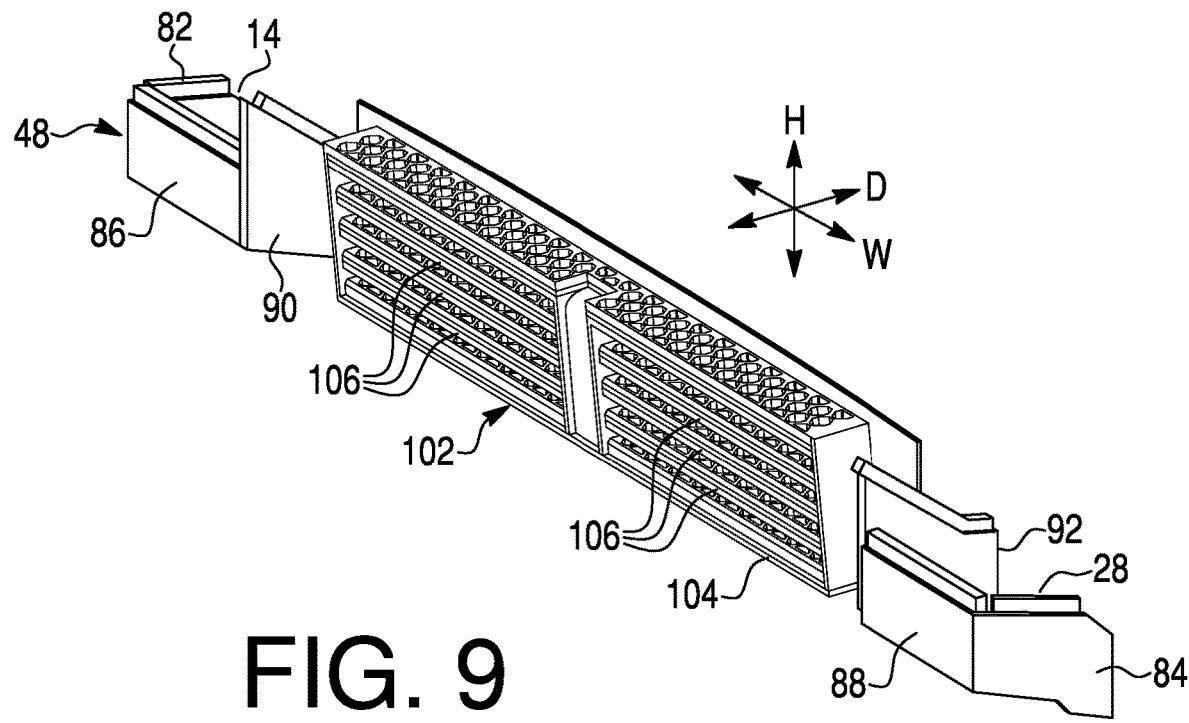
FIG. 9 is a rear perspective view of the central baffle and the central shutter of FIG. 8.

Referring to FIGS. 7-9 collectively, the central baffle 48 can extend in each of the depth direction D, the height direction H, and the width direction W. The central baffle 48 can be elongated in the width direction W as compared to the extent in the depth direction D and the height direction H. The central baffle 48 can include a bottom wall 80, a pair of side walls 82, 84, a pair of back walls 86, 88, a pair of inner walls 90, 92 and a pair of openings 94, 96. The walls 80, 82, 84, 86, 88, 90, 92 can be integrally formed as a single, homogenous structure. The bottom wall 80, the first side wall 82, the first inner wall 90 and the bottom of the upper baffle 50 can form and surround the first air intake opening 14 in the secondary intake opening 28. The bottom wall 80, the second side wall 84, the second inner wall 92 and the bottom of the upper baffle 50 can form and surround the second air intake opening 28 of the air intake assembly 12. The bottom wall 80, the side walls 82, 84, the inner walls 90, 92 and the bottom of the upper baffle 50 can form and surround the central air intake opening 30 of the air intake assembly 12.

Referring to FIG. 9, the central baffle 48 can include a pair of projections 98, 100 that extend from and are connected the bottom wall 80. The projections 98, 100 can extend away from the bottom wall 80 along the height direction H of the air intake assembly 12. The projections 98, 100 can extend along the bottom wall 80 along the width direction W of the air intake assembly 12. The projections 98, 100 can extend along the respective one of the openings 94, 96. The first projection 98 can extend from and be connected to the first side wall 82 and the first inner wall 90. The second projection 100 can extend from and be connected to the second side wall 84 and the second inner wall 92.

Referring to FIGS. 7-9, the air intake assembly 12 can include a central shutter 102. The central shutter 102 can be mounted on the central baffle 48 in any appropriate manner that secures the central shutter 102 to the central baffle 48. FIGS. 7 and 8 show a front perspective view of the central baffle 48 and the central shutter 102. FIG. 9 shows a rear perspective view of the central baffle 48 and the central shutter 102. The central shutter 102 can extend across the central air intake opening 30 along the width direction W of the air intake assembly 12. The central shutter 102 can abut the bottom wall 80 of the central baffle 48 and can be connected to the bottom wall 80 of the central baffle 48 in any appropriate manner.

The central shutter 102 can include a frame 104 and a plurality of louvers 106. Each of the louvers 106 can be pivotally connected to and mounted within the frame 104. In the exemplary embodiment, the louvers 106 can pivot about an axis that extends along the width direction W.

The central shutter 102 can include an electric motor, such as the electric motor 168 schematically illustrated in FIG. 10, that is connected to at least one of the louvers 106 and can pivot each of the louvers 106 between an opened position and a closed position. When in the opened position, the louvers 106 can permit fluid communication between the central air intake opening 30 and the first and second heat exchangers 36, 38. When in the closed position, the louvers 106 can close fluid communication between the central air intake opening 30 and the first and second heat exchangers 36, 38. The louvers 106 can be moved to an intermediate position that is between the closed position and the opened position to provide a reduced airflow through the central baffle 48 as compared to the opened position. The opened and closed positions of the louvers 106 can correspond to the opened and closed positions of the louvers schematically illustrated in FIG. 10.

Referring to FIG. 5, the baffle 50 can abut the rear surface 110 of the body panel 18. The rear surface 110 and the upper baffle 50 can enclose a chamber 112 through which air can flow to the air duct 44. Arrows in FIG. 5 show that air that enters the air intake openings 14, 28 can exit the central baffle 48 via the openings 94, 96 in the central baffle 48. The air that exits the openings 94, 96 can enter the chamber 112 formed by the upper baffle 50 and the body panel 18. The air that enters the chamber 112 can exit the upper baffle 50 and enter the air duct 44.

The upper baffle 50 can be located above the central baffle 48 in the vertical direction of the vehicle 10. The air that exits the central baffle 48 can flow along a path that is spaced outside of the central baffle 48 and the upper baffle 50. This external air path can follow an upward trajectory against gravity. The air intake assembly 12 can use gravity to extract at least some of the entrained snow, liquid water, and/or other debris from the air flowing along this external path. Thus, the air intake system 12 can prevent or at least reduce the amount snow, liquid water, and/or debris that can accumulate in the air intake assembly 12.

Referring to FIGS. 4 and 10, the upper baffle 50 can extend in each of the height direction H, the depth direction D and the width direction W of the air intake assembly 12. The upper baffle 50 can include a bottom wall 114, a back wall 116, a pair of side walls 118, 120 and a plurality of holes 122 in each of the side walls 118, 120. The walls 114, 116, 118, 120 can be integrally formed as a single, homogenous structure.

The bottom wall 114 can extend along the width direction W and the depth direction D of the air intake assembly 12. The bottom wall 114 can extend away from the back wall 116 along the depth direction D. The bottom wall 114 can extend along the back wall 116 along the width direction W. The bottom wall 114 can extend from and be connected to each of the side walls 118, 120.

The back wall 116 can extend along the width direction W and the height direction H of the air intake assembly 12. The back wall 116 can extend away from the bottom wall 114 along the height direction H. The back wall 116 can extend along the bottom wall 114 along the width direction W. The back wall 116 can extend from and be connected to each of the side walls 118, 120.

Each of the side walls 118, 120 can extend in the height direction H and the depth direction D. The side walls 118, 120 can be spaced away from each other in the width direction W. Each of the side walls 118, 120 can extend away from the bottom wall 114 in the height direction H. Each of the side walls 118, 120 can extend away from the back wall in the depth direction D.

The plurality of holes 122 can be distributed across side walls 118, 120 in an appropriate manner to achieve the desired flow rate through the side walls 118, 120. The holes 122 can be spaced away from each other by a regular interval. Each of the holes 122 can have any appropriate shape in size that can achieve the desired flow rate through the side walls 118, 120. The size and shape of the holes 122 can be configured to act as a filter that collects at least some of the snow, liquid water, and/or debris entrained in the air entering the upper baffle 50.

The vehicle 10 can include fenders that extend along the sides of the front end assembly 16. The side walls 118, 120 can generally face the fenders in the transverse direction of the vehicle 10. Thus, the air intake system/assembly 12 can also be referred to as a vehicle fender air intake assembly.

Figure 11:
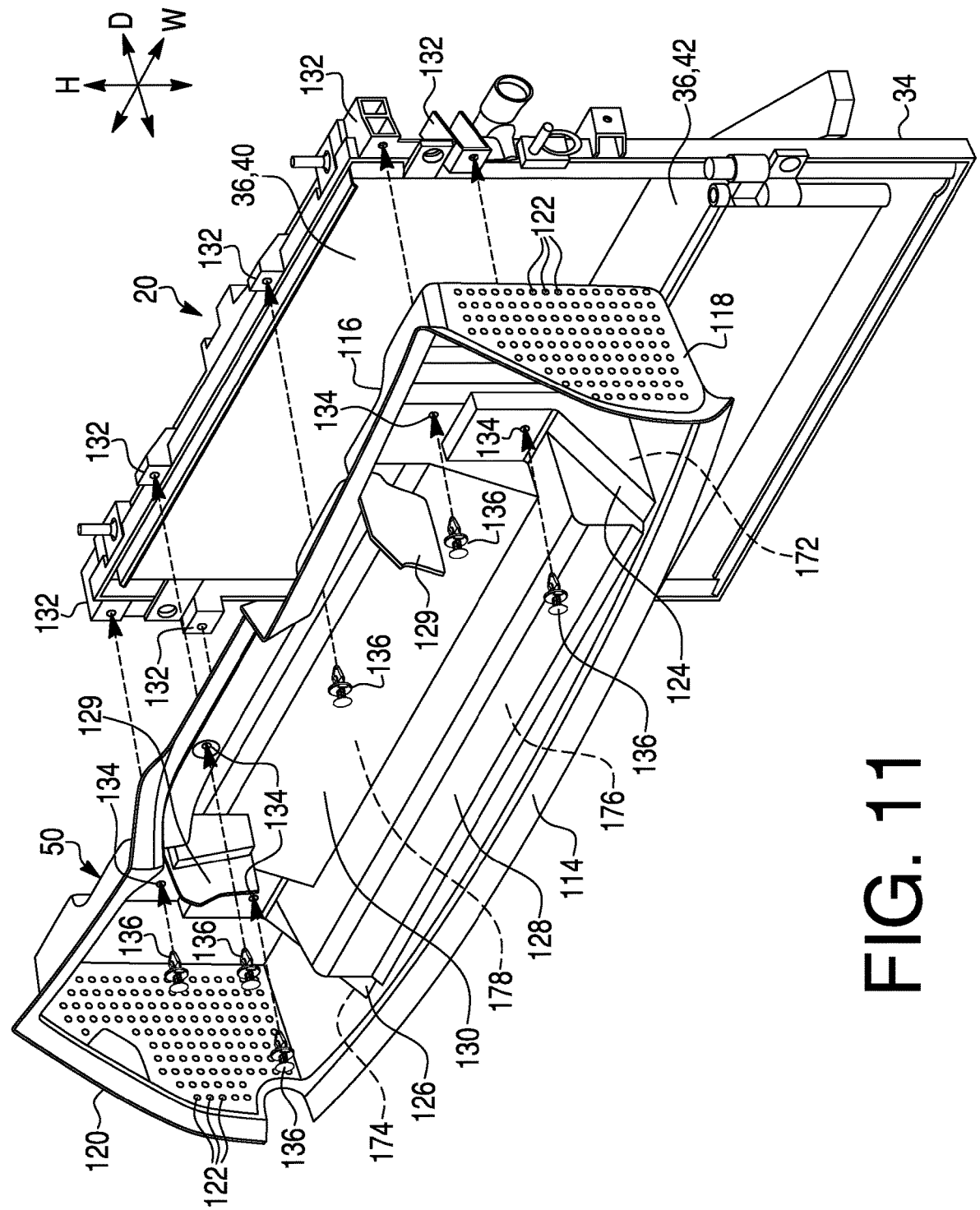
FIG. 11 is a perspective view of the heat exchanger module and the upper baffle of the vehicle of FIG. 1

Referring to FIGS. 4, 5 and 11 collectively, the upper baffle 50 can be mounted on top of the central baffle 48 in the height direction H of the air intake assembly 12 (which is also the vertical direction V of the vehicle 10). The bottom wall 114 can include an irregular surface contour to accommodate structure(s) and airflow path(s) adjacent to and/or abutting the bottom wall 114. For example, the bottom wall 114 can include a pair of side convex portions 124, 126 and a central convex portion 128. The convex portions 124, 126, 128 can be concave portions 172, 174, 176 when viewed from the opposite side of the upper baffle 50 with respect to the height direction H. As shown in FIG. 4, the first inner wall 90 of the central baffle 48 can extend into the first concave portion 172 and the second inner wall 92 of the central baffle 48 can extend into the second concave portion 174. The central shutter 102 can extend into the central concave portion 176. The central shutter 102 can be spaced away from the central concave portion 176 so that air entering the central air intake opening 30 can freely flow toward the central shutter 102.

The back wall 116 can include an irregular surface contour to accommodate structure(s) and airflow path(s) adjacent to and/or abutting the back wall 116. For example, the back wall 116 can include a convex portion 130. The convex portion 130 can be a concave portion 178 when viewed from the opposite side of the upper baffle 50 with respect to the depth direction D. The concave portion 178 can generally face the first heat exchanger 36 and be spaced away from the first heat exchanger 36. The convex portion 130 can be inclined with respect to the depth direction D and the height direction H so that the concave portion 178 guides air flowing along the first heat exchanger 36 in the vertical direction V of the vehicle 10 to be deflected toward the first heat exchanger 36.

Referring to FIGS. 4, 5 and 11, the upper baffle 50 can include a pair of deflectors 129 extending downward from an upper edge and toward the central convex portion 128 of the bottom wall 114. The deflectors 129 can be spaced inwardly away from a respective one of side walls 118, 120 and spaced away from the central convex portion 128 in the height direction as view in FIGS. 4 and 11 and the vertical direction V as viewed in FIG. 5. The deflectors 129 can be inclined at an acute angle with respect to the height direction H and the vertical direction V.

Referring to FIG. 5, air that enters either end of the upper baffle 50 via the holes 118 can flow toward the respective deflector 129 along the transverse direction T of the vehicle 10. The deflector 129 can redirect the air to flow toward the front end of the vehicle 10 in the longitudinal direction L of the vehicle 10 and to flow around the deflectors 129 before entering the air duct 44. The deflectors 129 can also redirect the air to flow between the bottom edge of the deflectors 129 and the central convex portion 128. The deflectors 129 can have any appropriate shape that provides the desired flow of air through the upper baffle 50.

Referring to FIG. 11, the upper baffle 50 can be mounted on the shroud 34 of the heat exchanger module 20. Referring to FIGS. 3 and 11, the shroud 34 can include a plurality of mounting brackets 132 spaced along the perimeter of the shroud 34. Each of the mounting brackets 132 can include a through hole. Referring to FIGS. 4 and 11, the upper baffle 50 can include a plurality of mounting holes 134 that extend through the back wall 116. Each of a plurality of push pins 136 can be inserted through a respective one of the mounting holes 134 and the through hole of a respective one of the mounting brackets 132. The push pins 136 can connect the upper baffle 50 to the shroud 34.

Figure 12:
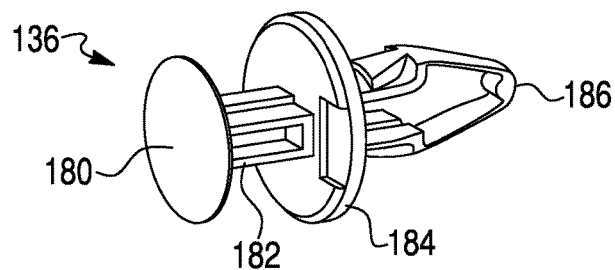
FIG. 12 is a perspective view of an exemplary fastener.

FIG. 12 illustrates the push pin 136. The push pin 136 can include a head 180, a stem 182, a flange 184 and a resilient projection 186. The flange 184 can abut the back wall 116 and the resilient projection 186 can pass through the mounting hole 134 and the through hole in the bracket 132 to expand to a size larger than the through hole in the bracket 132. Thus, the push pins 136 can secure the upper baffle 50 to the shroud 34.

Figure 15:
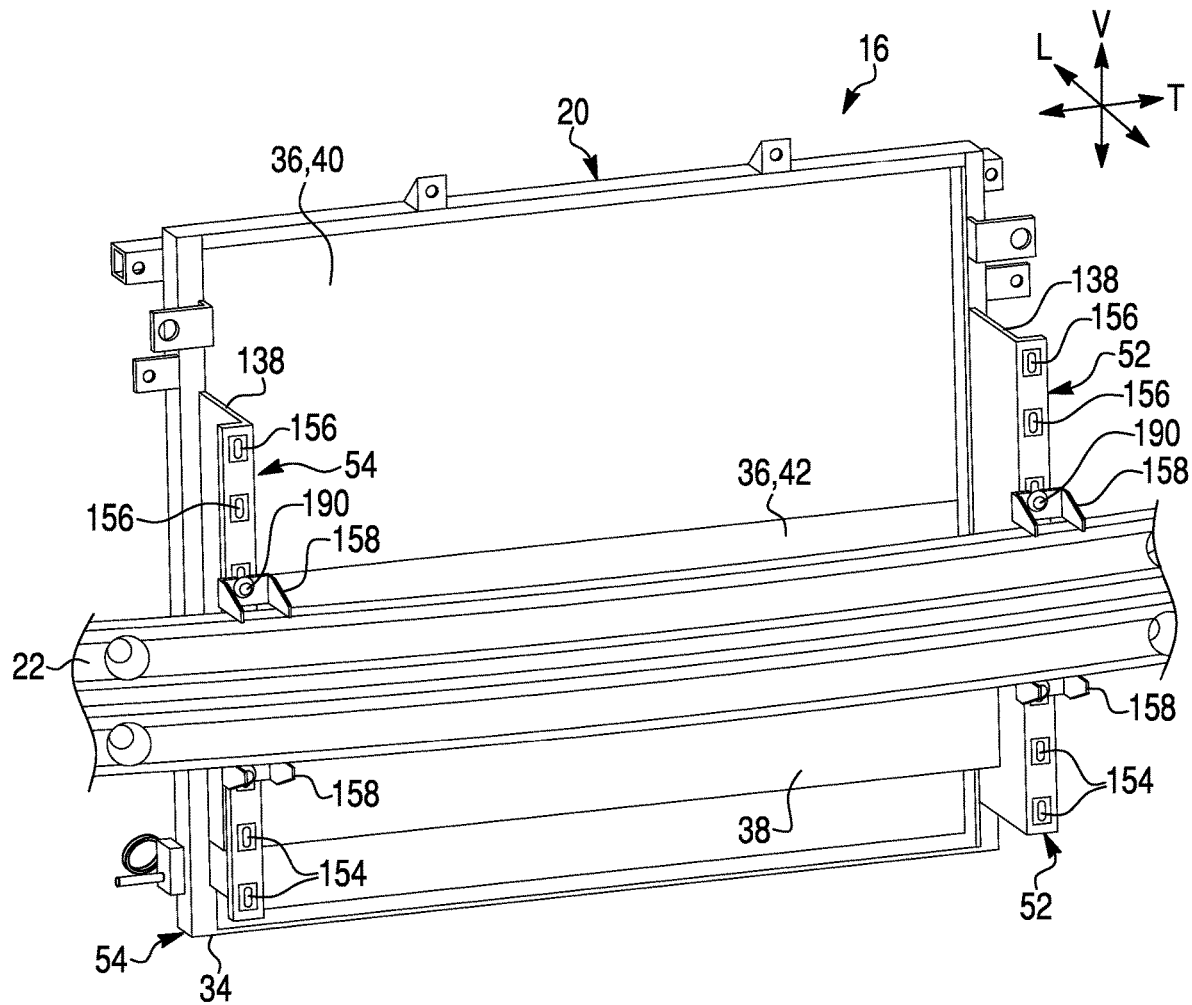
FIGS. 15-18 are front perspective views showing an exemplary assembly sequence for the front assembly of the vehicle of FIG. 1.

In contrast to mounting the upper baffle 50 onto structure of the heat exchanger module 20, the mounting assemblies 52, 54 can mount the lower baffle 46 and the central baffle 48 onto structure of the vehicle 10 that is spaced away from the heat exchanger module 20. Referring to FIG. 15, the mounting assemblies 52, 54 can be mounted onto the beam 22.

Figure 13:
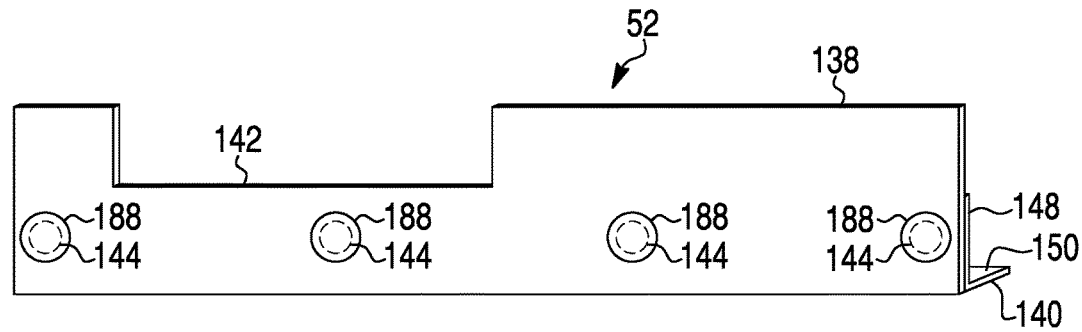
FIG. 13 is a perspective view of a first mounting assembly of the air intake assembly of the vehicle of FIG. 1.
Figure 14:
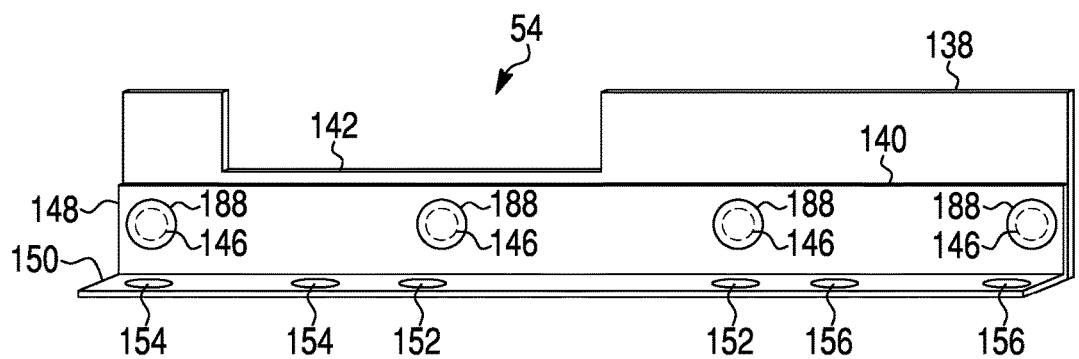
FIG. 14 is a perspective view of a second mounting assembly of the air intake assembly of the vehicle of FIG. 1.

FIGS. 13 and 14 show further details of the mounting assemblies 52, 54. Each of the mounting assemblies 52, 54 can include a shutter bar 140 and a side baffle 138. The structure of the shutter bar 140 and the side baffle 138 can be the same for each of the mounting assemblies 52, 54. The shutter bar 140 of the first mounting assembly 52 can be mounted on a first side of the side baffle 138 of the first mounting assembly 52. The shutter bar 140 of the second mounting assembly 54 can be mounted on a second side of the side baffle 138 of the second mounting assembly 54, where the second side is opposite to the first side.

Each of the shutter bars 140 can be a flat plate-shaped structure and can include a recess 142 and a plurality of through holes 146. Each of the through holes 146 can align with the plurality of through holes 144 of the side baffle 138. One of a plurality of fasteners 188 can extend through a respective pair of the through holes 144, 146 to connect the shutter bar 140 to the side baffle 138. FIGS. 13 and 14 schematically illustrate the fasteners 188 by a circle. Each fastener 188 can be any appropriate fastener such as but not limited to a clip, a threaded bolt, and bolt and nut assembly, a rivet, etc.

Referring to FIG. 14, the shutter bar 140 can have a pair of walls 148, 150. The walls 148, 150 can be orthogonal or substantially orthogonal to each other such that one of ordinary skill would perceive the walls 148, 150 as being orthogonal to each other. The first wall 148 can abut and extend along the side baffle 138. The through holes 144 can be formed in the first wall 148.

The second wall 150 can include a pair of first through holes 152, a pair of second through holes 154 and a pair of third through holes 156. As will be described in more detail below, the first through holes 152 can be used to secure the mounting assemblies 52, 54 to the beam 22, the second through holes can be used to secure the lower baffle 46 to the mounting assemblies 52, 54 and the third mounting holes 156 can be used to secure the central baffle 48 to the mounting assemblies 52, 54.

Referring to FIG. 15 the beam 22 can include a plurality of mounting brackets 158. The mounting brackets 158 can be secured to the beam 22 in any appropriate manner such as but not limited to welding, adhesives, etc. A mechanical fastener 190 can be inserted through a respective one of the brackets 158 and a respective one of the first mounting holes 152 to connect each of the mounting assemblies 52, 54 to the beam 22.

Each of the side baffles 138 can extend from the beam 22 to the heat exchanger module 20 along the longitudinal direction L of the vehicle 10. Each of the side baffles 138 can obstruct the flow of air in the transverse direction T of the vehicle 10. Thus, the side baffles 138 can direct air that enters the lower air intake opening 32 and the central air intake opening 30 toward the heat exchangers 36, 38.

Referring to FIG. 7, the lower baffle 46 can include a plurality of through holes 160. The through holes 160 can align with the second through holes 154 of each of the mounting assemblies 52, 54. Threaded fasteners can be inserted into the through holes 160, 154 to secure the lower baffle 46 to the mounting assemblies 52, 54.

Referring to FIGS. 7 and 8, the central baffle 48 can include a plurality of through holes 162. The through holes 162 can align with the third through holes 156 of each of the mounting assemblies 52, 54. Threaded fasteners can be inserted into the through holes 162, 156 to secure the central baffle 48 to the mounting assemblies 52, 54.

The inner walls 90, 92 can be spaced away from the central shutter 102 in the width direction W of the air intake assembly 12. The side baffles 138 can extend from and abut the inner walls 90, 92. The side baffles 138 can extend from the inner walls to the heat exchanger module 20 along the longitudinal direction L of the vehicle 10.

Referring to FIG. 10, each of the shutters 66, 102 can include a connector 170 electrically connected to the electric motor 168. The vehicle 10 can include a wire harness 164 that includes a mating connector 166 that can be connected to the connector 170. The wire harness 164 can provide electric power and electrical signals to the electric motor 168.

FIGS. 15-18 illustrate different stages of assembly of the front end assembly 16 of the vehicle 10. The heat exchanger module 20 can be mounted onto the vehicle 10 and secured to any appropriate structure of the vehicle 10. The mounting assemblies 52, 54 can be secured to the beam 22 before or after the heat exchanger module 20 is connected to the vehicle 10. FIG. 15 shows the heat exchanger module 20 and the mounting assemblies 52, 54 assembled to the vehicle 10 prior to assembling the baffles 46, 48, 50 to the vehicle 10.

The lower shutter 66 can be mounted onto the lower baffle 46 to form a lower sub-assembly. The central shutter 102 can be mounted onto the central baffle 48 to form a central sub-assembly. The lower sub-assembly 46, 66 and central sub-assembly 48, 102 can be created before being assembled onto the vehicle 10.

Figure 16:
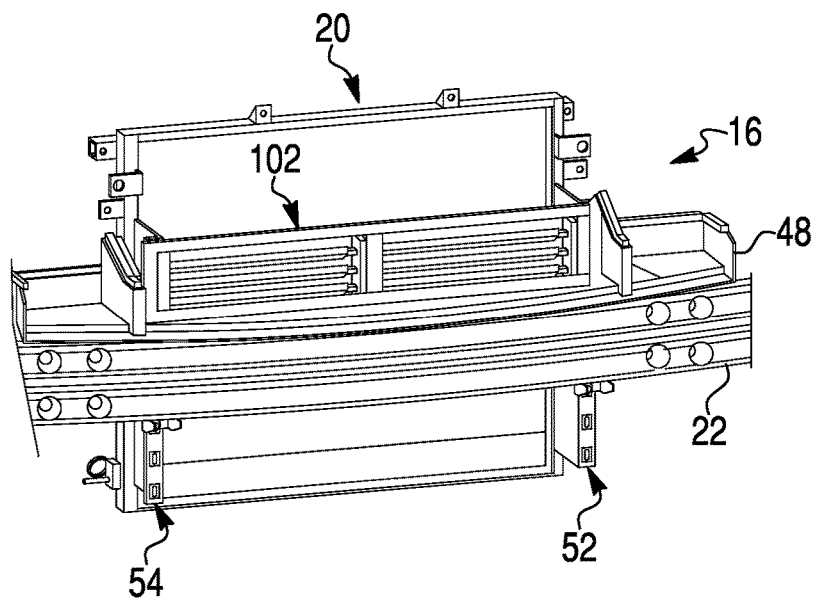
Figure 17:
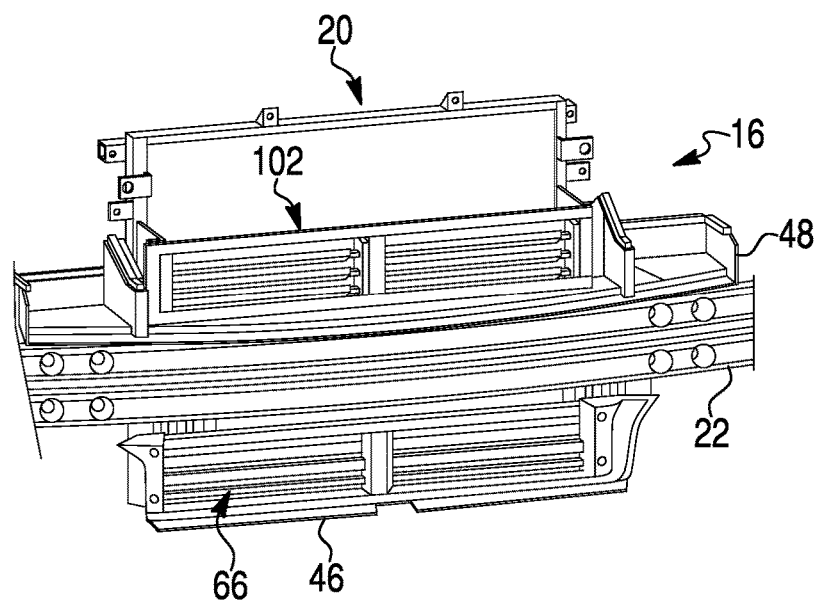

The lower sub-assembly 46, 66 and central sub-assembly 48, 102 can be secured to the vehicle 10 after the mounting assemblies 52, 54 have been secured to the beam 22. The lower sub-assembly 46, 66 and central sub-assembly 48, 102 can be assembled to the vehicle 10 in any order. FIG. 16 shows an assembly stage of the front end assembly 16 in which the central sub-assembly 48, 102 has been connected to the mounting assemblies 52, 54 prior to connecting the lower sub-assembly 46, 66. FIG. 17 shows an assembly stage of the front end assembly 16 in which the lower sub-assembly 46, 66 has been connected to the mounting assemblies 52, 54 after connecting the central sub-assembly 48, 102. However, the sequence of FIGS. 16 and 17 can be reversed such that the lower sub-assembly 46, 66 is connected to the mounting assemblies 52, 54 before the central sub-assembly 48, 102 is connected to the mounting assemblies 52, 54.

The mating connector 166 of the wire harness 164 for the central sub-assembly 48, 102 can be connected to the connector 170 of central sub-assembly 48, 102 after the central sub-assembly 48, 102 has been mounted onto the first and second mounting assembly 52, 54.

The mating connector 166 of the wire harness 164 for the lower sub-assembly 46, 66 can be connected to the connector 170 of lower sub-assembly 46, 66 after the lower sub-assembly 46, 66 has been mounted onto the first and second mounting assembly 52, 54.

Figure 18:
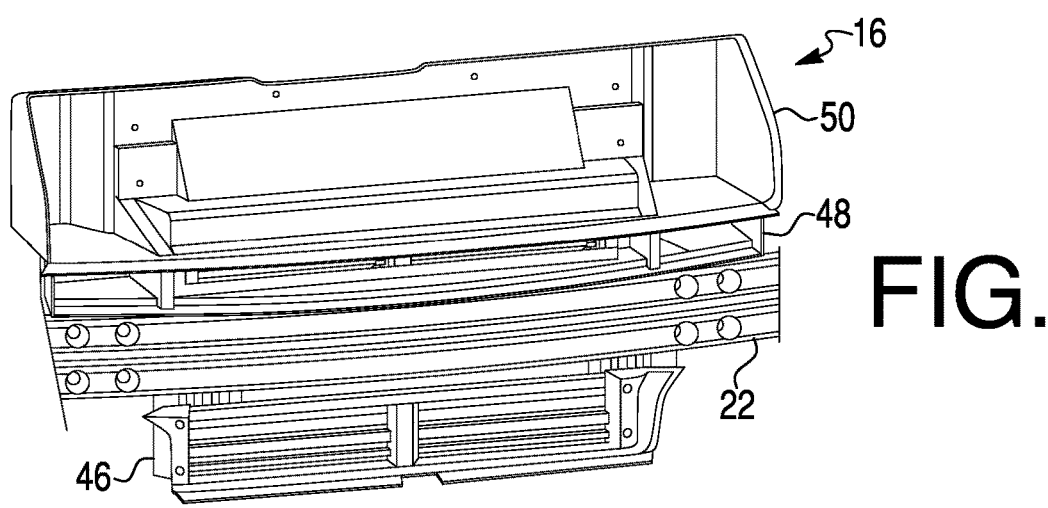

Regardless of the order in which the lower sub-assembly 46, 66 and central sub-assembly 48, 102 are mounted to the vehicle 10, the upper baffle 50 can be connected to the vehicle 10 after the central sub-assembly 48, 102 has been assembled to the vehicle 10 and after the heat exchanger module 20 has been assembled to the vehicle 10, as shown in FIG. 18. Installing the upper baffle 50 any time after installing the central baffle 48 can facilitate the insertion of the inner walls 90, 92 into the concave surface of the convex portions 124.

While certain embodiments of the invention are described above, it should be understood that the invention can be embodied and configured in many different ways without departing from the spirit and scope of the invention.

The exemplary upper baffle 50 described above can include a plurality of openings 122 formed in each of the side walls 118, 120. However, exemplary embodiments can include an upper baffle 50 that has a single opening formed in each of the side walls 118, 120. The single opening can have a surface area that is equivalent to the surface area provide by the plurality of openings 122 of each of the side walls 118, 120. Thus, exemplary embodiments of the upper baffle can include at least one opening in each of the side walls.

Exemplary embodiments can include a filter or screen extending across the at least one opening in the side walls 118, 120 where the size and shape of the at least one opening is large enough for entrained snow, liquid water, and/or other debris to pass through the at least one opening.

In the exemplary embodiment described above, the shutter bar 140 can be connected to the side baffle by a mechanical fastener. The through holes 146 of the shutter bar 140 and/or the through hole 144 of the side baffle 138 can include internal threads. Alternate embodiments can include a nut can welded onto the side baffle 138 at each of the through holes 146 or onto the shutter bar 140 at each of the through holes 144.

Instead of mechanical fasteners, the shutter bar 140 can be connected to the side baffle 138 by one or more of welds, an adhesive, etc.

Instead of forming the mounting assemblies 52, 54 from the separate pieces of the shutter bar 140 and the side baffle 138, the mounting assemblies 52, 54 can be stamped and/or machined from a single, homogenous blank or molded as a single, homogenous structure contiguous with the shutter bar 140 and/or side baffle 138.

Each of the exemplary baffles 46, 48, 50 are described above as being formed as a single, homogenous structure. However, alternate embodiments can include any of the baffles 46, 48, 50 formed from individual parts that are assembled together in any appropriated manner.

In an alternate embodiment, the louvers 70, 106 can pivot about an axis that extends in the height direction H of the air intake assembly 12.

Alternate embodiments can omit the second heat exchanger 38 from the heat exchanger module 20.

The vehicle 10 can be any type of automobile, including a passenger car, minivan, truck, airplane, boat, mower, any type of all-terrain vehicle (ATV), semi-tractor, off-highway vehicle, etc. The vehicle 10 can be propelled by a power source such as but not limited to an internal combustion engine, an electric motor, or a hybrid of an internal combustion engine and an electric motor. If propelled by an electric motor or a hybrid of an electric motor and an internal combustion engine, the vehicle 10 can include a battery pack for storing and discharging electrical power.

A first structure and second structure are considered to be in fluid communication if the structures are configured such that at least a measurable amount of a fluid, such as air, located in the first structure is guided by and passes from the first structure to the second structure.

What is claimed is:

1. A vehicle fender air intake assembly for a vehicle including a body structure, the vehicle fender air intake assembly comprising:
   a central baffle configured to be mounted to the body structure;
   a central shutter mounted on the central baffle;
   a lower baffle configured to be mounted to the body structure;
   a lower shutter mounted on the lower baffle; and
   an upper baffle including a first side and a second side that opposes the first side, the upper baffle terminates at the first side and the second side, the first side includes a first opening in fluid communication with the central baffle, and the second side includes a second opening in fluid communication with the central baffle, wherein the first opening and the second opening face in a first direction, the central baffle includes an intake opening that faces in a second direction that is different from the first direction, and the intake opening is in fluid communication with the first opening.

2. A front end assembly for a vehicle comprising:

a beam extending along a transverse direction of the vehicle;

a heat exchanger module adjacent to the beam and including, a shroud, and at least one air-to-liquid heat exchanger mounted within the shroud; and an air intake assembly including, a first baffle connected to the beam and in fluid communication with air-to-fluid heat exchanger;

a first shutter mounted on the first baffle and configured to selectively open and close fluid communication between the first baffle and the air-to-liquid heat exchanger;

a second baffle connected to the beam and in fluid communication with the air-to-liquid heat exchanger;

a second shutter mounted on the second baffle and configured to selectively open and close fluid communication between the second baffle and the air-to-liquid heat exchanger; and a third baffle mounted onto the shroud and adjacent to the air-to-liquid heat exchanger, the third baffle includes a first side and a second side that opposes the first side, the first side includes a first opening in fluid communication with the second baffle, and the second side includes a second opening in fluid communication with the second baffle wherein the first opening and the second opening face in the transverse direction, the second baffle includes an intake opening that faces in a direction that is different from the transverse direction, and the intake opening is in fluid communication with the first opening.

3. The front end assembly according to claim 2, further comprising:

a body panel extending along the beam in the transverse direction and a vertical direction of the vehicle, the body panel covering the third baffle in the transverse direction and the vertical direction.

4. The front end assembly according to claim 3, wherein the third baffle abuts the body panel, and is located between the body panel and the heat exchanger module in a longitudinal direction of the vehicle, the body panel includes a first body opening and a second body opening that is spaced away from the first body opening, the second body opening is spaced away from the third baffle, both of the first body opening and the second body opening face the longitudinal direction of the vehicle and are in fluid communication with the first baffle, and the second baffle includes, a first intake passage in fluid communication with both of the first body opening and the first opening of the third baffle, a second intake passage in fluid communication with both of the first body opening and the second opening of the third baffle, and a third intake passage in fluid communication with the first body opening and the air-to-liquid heat exchanger.

5. The front end assembly according to claim 2, further comprising:

a first shutter bar connected to the beam;

a first side baffle mounted on the first shutter bar;

a second shutter bar connected to the beam; and a second side baffle mounted on the second shutter bar, wherein each of the first baffle and the second baffle is mounted on both of the first shutter bar and the second shutter bar.

6. The front end assembly according to claim 5, further comprising:

a first pair of brackets mounted on the beam, the first shutter bar is connected to the first pair of brackets; and a second pair of brackets mounted on the beam, the second shutter bar is connected to the second pair of brackets.

7. The front end assembly according to claim 2, further comprising:

an air duct connected on a downstream side of the third baffle and in fluid communication with the third baffle.

8. The front end assembly according to claim 2, wherein the first baffle is located on one side of the beam in a vertical direction of the vehicle, and the second baffle and the third baffle are located on another side of the beam in the vertical direction, and the second baffle is located between the first baffle and the third baffle in the vertical direction.

9. The front end assembly according to claim 2, wherein the third baffle includes:

a first wall extending along the transverse direction and a vertical direction of the vehicle and is elongated in the transverse direction;

a second wall extending along the transverse direction and a longitudinal direction of the vehicle, the second wall is elongated in the transverse direction, the second wall is connected to and extends away from the first wall along the longitudinal direction;

the first side extends along the longitudinal direction and the vertical direction and is connected to the first wall and the second wall, the second side extends along the longitudinal direction and the vertical direction and is connected to the first wall and the second wall, the second side is spaced away from the first side in the transverse direction.

10. The front end assembly according to claim 9, further comprising:

a body panel extending along the beam in the transverse direction and the vertical direction of the vehicle, the body panel covering the third baffle in the transverse direction and the vertical direction, wherein each of the first wall, the second wall, the first side and the second side includes a free edge, and the free edges collectively form a peripheral edge of the upper baffle, and the peripheral edge abuts the body panel.

11. The front end assembly according to claim 2, wherein the second baffle includes a central intake opening and a first intake opening, and the second shutter is located in the central intake opening and is spaced away from the first intake opening.

12. The front end assembly according to claim 11, wherein
the third baffle further includes a second intake opening,
the central intake opening is located between the first intake opening and the second intake opening, and
the second shutter is spaced away from the second intake opening.

13. The front end assembly according to claim 12, wherein
the first intake opening is in fluid communication with the first opening of the third baffle, and
the second intake opening is in fluid communication with the second opening of the third baffle.

14. The front end assembly according to claim 2, wherein
the second shutter includes at least one louver that is movable relative to the second baffle between an opened position where the at least one louver of the first shutter permits airflow through the second baffle and a closed position where the at least one louver of the first shutter obstructs airflow through the second baffle, and
the first shutter includes at least one louver that is movable relative to the first baffle between an opened position where the at least one louver of the first shutter permits airflow through the first baffle and a closed position where the at least one louver of the first shutter obstructs airflow through the first baffle.

15. The front end assembly according to claim 2, wherein
the first side includes a plurality of holes that forms the first opening,
the second side includes a plurality of holes that forms the second opening, and
the third baffle includes a first deflector spaced inwardly away from the first side and a second deflector spaced inwardly from the second side, the first deflector redirects air flowing through the first opening and the second deflector redirects air flowing through the second opening.

16. The front end assembly according to claim 2, wherein the first baffle, the second baffle and the third baffle are spaced away from each other in a vertical direction of the vehicle.

17. A method for assembling a vehicle fender air intake to a body of a vehicle, the method comprising:
connecting a heat exchanger module to the body, the heat exchanger module includes a shroud and at least one air-to-liquid heat exchanger mounted adjacent the shroud;
mounting a lower shutter to a lower baffle, the lower shutter is configured to selectively open and close fluid communication between the lower baffle and the air-to-liquid heat exchanger;
mounting a central shutter to a central baffle, the central shutter is configured to selectively open and close fluid communication between the central baffle and the air-to-liquid heat exchanger;
connecting a respective one of a pair of side baffles to a respective one of a pair of shutter bars;
connecting the shutter bars to the body after connecting the side baffles to the shutter bars;
connecting the central baffle to the shutter bars;
connecting a first wire harness to the central shutter after connecting the central baffle to the shutter bars;
connecting the lower baffle to the shutter bars;
connecting a second wire harness to the lower shutter after connecting the lower baffle to the shutter bars; and
mounting an upper baffle on the shroud.

18. The method according to claim 17, wherein
connecting a respective one of a pair of side baffles to a respective one of a pair of shutter bars includes,
inserting a first plurality of clips through a first one of the side baffles and a first one of the shutter bars, and
inserting a second plurality of clips through a second one of the side baffles and a second one of the shutter bars; and
mounting the upper baffle on the shroud includes inserting a plurality of push pins through both of the upper baffle and the shroud.

\* \* \* \* \*